(12) United States Patent
Kalnins et al.

(10) Patent No.: US 12,703,472 B2
(45) Date of Patent: Aug. 11, 2026

(54) ELECTRIC MARINE PROPULSION SYSTEM AND CONTROL METHOD

(71) Applicant: Brunswick Corporation, Mettawa, IL (US)

(72) Inventors: Jared D. Kalnins, Neenah, WI (US); Mitchell J. Baer, Fond Du Lac, WI (US); Robert Raymond Osthelder, Omro, WI (US); Bradley J. Phelps, Fond du Lac, WI (US); Lukas G. Neveau, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 805 days.

(21) Appl. No.: 17/985,616

(22) Filed: Nov. 11, 2022

(65) Prior Publication Data

US 2024/0158063 A1 May 16, 2024

(51) Int. Cl.

*B63H 21/17* (2006.01)
*B60L 58/20* (2019.01)
*B63H 21/21* (2006.01)

(52) U.S. Cl.

CPC .............. *B63H 21/17* (2013.01); *B60L 58/20* (2019.02); *B60L 2200/32* (2013.01); *B63H 2021/216* (2013.01)

(58) Field of Classification Search

CPC .............. B63H 21/17; B63H 2021/216; B63H 20/007; B60L 58/20; B60L 2200/32; B60L 2240/545; B60L 58/21; B60L 2240/547

USPC .......................................................... 320/137

See application file for complete search history.

(56) References Cited

U.S. PATENT DOCUMENTS 6,507,164 B1 1/2003 Healey et al.
6,652,330 B1 11/2003 Wasilewski
6,885,919 B1 4/2005 Wyant et al.
6,902,446 B1 6/2005 Healey
7,218,118 B1 5/2007 Gonring
7,385,365 B2 6/2008 Feick
10,654,551 B1 5/2020 Doremus
2006/0106553 A1* 5/2006 Melichar ............ G01R 31/3647 702/63

(Continued)

OTHER PUBLICATIONS

Extended European Search Report, dated Apr. 23, 2024, in corresponding EP Application No. 23209264.3.

(Continued)

*Primary Examiner* — Huy Q Phan

(74) *Attorney, Agent, or Firm* — Andrus Intellectual Property Law, LLP

(57) ABSTRACT

An electric marine propulsion system configured to propel a marine vessel includes a power storage system including at least one battery, at least one electric motor powered by the power storage system and configured to rotate a propulsor to propel the marine vessel, and a control system. The control system is configured to identify a temperature and a maximum power limit for each battery, determine a system temperature offset based at least in part on the temperature and the maximum power limit for each battery, apply the system temperature offset to a system power limit to calculate a temperature compensated system power limit, and control the at least one electric motor based at least in part on the temperature compensated system power limit.

18 Claims, 12 Drawing Sheets

(56) References Cited

U.S. PATENT DOCUMENTS

| | | | | |
|---|---|---|---|---|
| 2010/0214029 | A1* | 8/2010 | McDonald | H03B 5/32 331/18 |
| 2012/0200435 | A1* | 8/2012 | Ngo | H03M 7/3082 341/61 |
| 2014/0046524 | A1* | 2/2014 | Brown | H01M 10/48 701/22 |
| 2014/0269811 | A1* | 9/2014 | Maleki | G01K 15/005 374/1 |
| 2016/0272076 | A1* | 9/2016 | Fan | B60L 53/14 |
| 2019/0221898 | A1* | 7/2019 | Machida | H01M 10/486 |
| 2020/0334722 | A1* | 10/2020 | Kurimoto | G06Q 30/0284 |
| 2021/0231739 | A1* | 7/2021 | Hong | H01M 10/44 |
| 2021/0255650 | A1* | 8/2021 | Tschirhart | H02J 1/14 |
| 2021/0367277 | A1* | 11/2021 | Takechi | H01M 10/482 |
| 2022/0242538 | A1 | 8/2022 | Gonring | |
| 2023/0227139 | A1* | 7/2023 | Phamdo | B63H 21/305 440/6 |

OTHER PUBLICATIONS

Torqeedo GmbH, Travel 503, 1003 S/L, 1003, 1103 CS/CL, https://media.torqeedo.com/downloads/manuals/torqeedo-Travel-manual-DE-EN.pdf, p. 82, accessed Jan. 4, 2022.

Examination Report in EP Application No. 23209264.3, mailed Jan. 12, 2026.

* cited by examiner

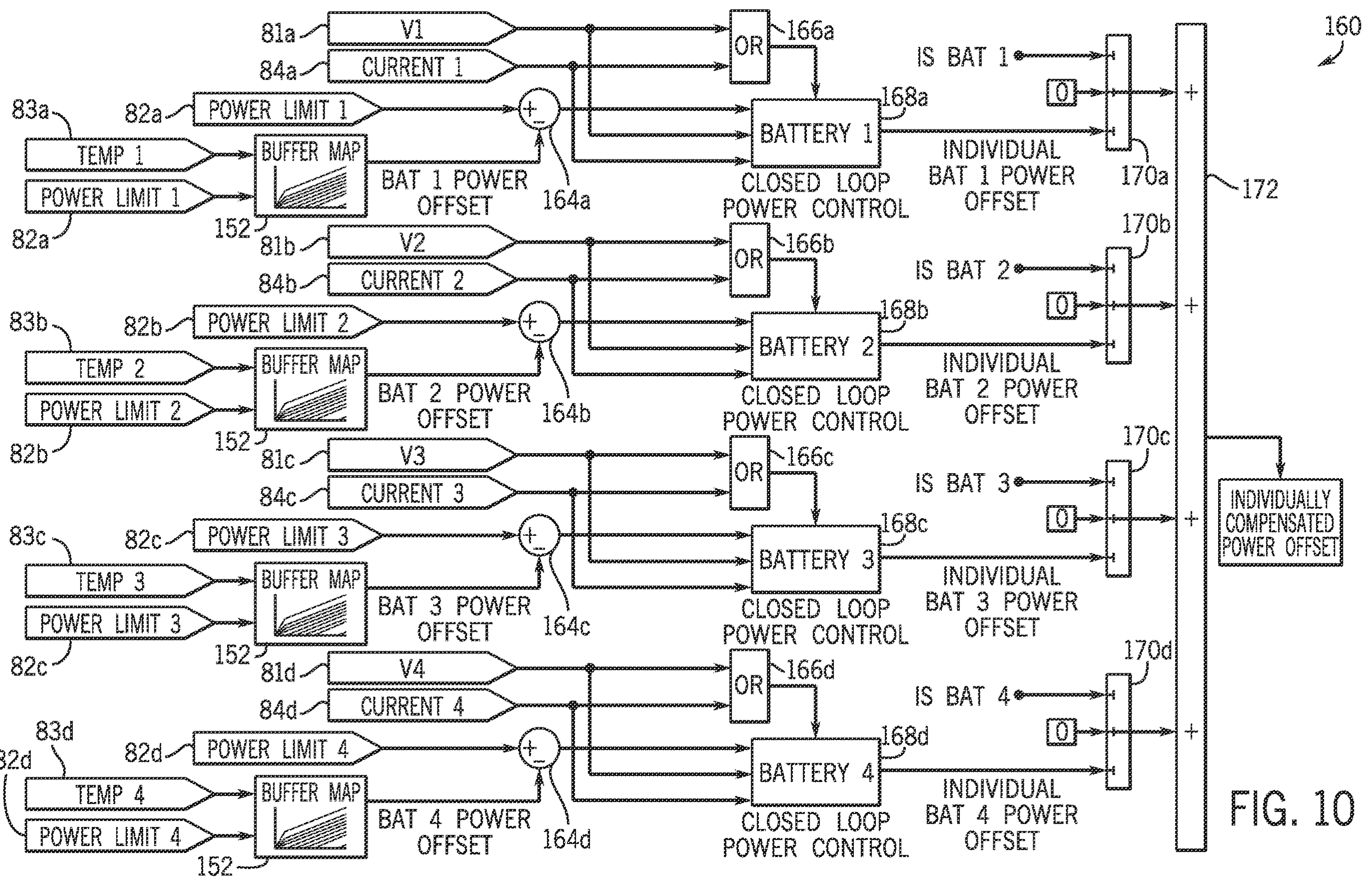
160
172
INDIVIDUALLY COMPENSATED POWER OFFSET
FIG. 10
170a
170b
170c
170d
IS BAT 1
IS BAT 2
IS BAT 3
IS BAT 4
0
INDIVIDUAL BAT 1 POWER OFFSET
INDIVIDUAL BAT 2 POWER OFFSET
INDIVIDUAL BAT 3 POWER OFFSET
INDIVIDUAL BAT 4 POWER OFFSET
168a
168b
168c
168d
BATTERY 1
BATTERY 2
BATTERY 3
BATTERY 4
CLOSED LOOP POWER CONTROL
166a
166b
166c
166d
OR
164a
164b
164c
164d
V1
V2
V3
V4
CURRENT 1
CURRENT 2
CURRENT 3
CURRENT 4
BAT 1 POWER OFFSET
BAT 2 POWER OFFSET
BAT 3 POWER OFFSET
BAT 4 POWER OFFSET
POWER LIMIT 1
POWER LIMIT 2
POWER LIMIT 3
POWER LIMIT 4
BUFFER MAP
152
81a
81b
81c
81d
84a
84b
84c
84d
82a
82b
82c
82d
TEMP 1
TEMP 2
TEMP 3
TEMP 4
83a
83b
83c
83d

ELECTRIC MARINE PROPULSION SYSTEM AND CONTROL METHOD

FIELD

The present disclosure generally relates to marine propulsions systems, and more particularly to electric marine propulsion systems having electric motors and methods for controlling power utilization thereof.

BACKGROUND

The following U.S. patents provide background information and are incorporated herein by reference, in entirety.

U.S. Pat. No. 6,507,164 discloses a trolling motor having current based power management including: an electric motor; a motor controller having an output for providing voltage to the motor; and a current sensor for measuring the electrical current flowing through the motor. Upon determining that the trolling motor has been operating above its continuous duty limit for a predetermined period of time, the motor controller begins reducing the voltage output to the motor until reaching an acceptable output voltage. In another embodiment, the controller is operated in three distinct modes with three distinct sets of operating parameters, namely: a normal mode wherein the output is set to a commanded level; a current limit mode wherein the output is set to a safe, predetermined level; and a transitional mode wherein the output is incrementally changed from the predetermined level to the commanded level.

U.S. Pat. No. 6,652,330 discloses a method for controlling the electrical system of a marine vessel which comprises the steps of measuring a battery potential, comparing the battery potential to a threshold voltage magnitude, and then disconnecting one or more of a plurality of electrical power consuming devices when the voltage potential is less than the threshold voltage magnitude. This is done to avoid the deleterious condition wherein an engine of the marine vessel is operating at idle speed and attempting to charge the battery while a plurality of electrical power consuming devices are operating and drawing sufficient current from the alternator to prevent the proper charging of the battery. In these circumstances, the battery potential can actually be depleted as the battery attempts to provide the additional required electrical current for the loads.

U.S. Pat. No. 6,885,919 discloses a process is provided by which the operator of a marine vessel can invoke the operation of a computer program that investigates various alternatives that can improve the range of the marine vessel. The distance between the current location of the marine vessel and a desired waypoint is determined and compared to a range of the marine vessel which is determined as a function of available fuel, vessel speed, fuel usage rate, and engine speed. The computer program investigates the results that would be achieved, theoretically, from a change in engine speed. Both increases and decreases in engine speed are reviewed and additional theoretical ranges are calculated as a function of those new engine speeds. The operator of the marine vessel is informed when an advantageous change in engine speed is determined.

U.S. Pat. No. 6,902,446 discloses a DC motor having a motor housing and a motor controller housed within the motor housing. In a preferred embodiment the heat producing components of the motor controller are in thermal communication with the housing such that the majority of the heat produced by such components will be readily conducted to the environment in which the motor is operating. When incorporated into a trolling motor, the motor housing of the present invention will be submerged so that controller produced heat will be dissipated into the water in which the trolling motor is operated.

U.S. Pat. No. 7,218,118 discloses a method for monitoring the condition of a battery of a marine propulsion system provides the measuring of a voltage characteristic of the battery, comparing the voltage characteristic to a preselected threshold value, and evaluating the condition of the battery as a function of the relative magnitudes of the voltage characteristic and the threshold value. The voltage characteristic of the battery is measured subsequent to a connection event when a connection relationship between the battery and an electrical load is changed. The electrical load is typically a starter motor which is connected in torque transmitting relation with an internal combustion engine. The voltage characteristic is preferably measured at its minimum value during the inrush current episode immediately prior to cranking the internal combustion engine shaft to start the engine.

U.S. Pat. No. 7,385,365 discloses a method for error detection of a brushless electric motor, where at least one first motor parameter is measured or determined, and a second, estimated motor parameter is estimated on the basis of the first motor parameter. The second, estimated motor parameter is compared to a second, measured or determined motor parameter. An error of the electric motor can be found out according to the comparison.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, an electric marine propulsion system configured to propel a marine vessel includes a power storage system including at least one battery, at least one electric motor powered by the power storage system and configured to rotate a propulsor to propel the marine vessel, and a control system. The control system is configured to identify a temperature and a maximum power limit for each battery, determine a system temperature offset based at least in part on the temperature and the maximum power limit for each battery, apply the system temperature offset to a system power limit to calculate a temperature compensated system power limit, and control the at least one electric motor based at least in part on the temperature compensated system power limit.

In another embodiment, a method of controlling an electric marine propulsion system including at least one battery and at least one electric motor powered by the at least one battery and configured to rotate a propulsor to propel a marine vessel includes identifying a temperature for each of the at least one battery, identifying a maximum power limit for each of the at least one battery, determining a system temperature offset based at least in part on the temperature and the maximum power limit for each of the at least one battery, applying the system temperature offset to a system power limit to calculate a temperature compensated system power limit, and controlling the at least one electric motor based at least in part on the temperature compensated system power limit.

Various other features, objects, and advantages of the invention will be made apparent from the following description taken together with the drawings.

BRIEF DESCRIPTION OF THE DRAWINGS

The present disclosure is described with reference to the following Figures.

FIG. 10 is a control diagram illustrating exemplary steps for applying the battery temperature offset power value determined in FIG. 9 to a plurality of batteries in accordance with the present disclosure.

DETAILED DESCRIPTION

The inventors have endeavored to design an electric marine propulsion system for a marine vessel with a power storage system in which batteries of the power storage system are not damaged and the marine vessel is not disabled due to overtemperature conditions. In doing so, the inventors have recognized a problem with electric marine propulsion systems having a plurality of separately controlled batteries where each battery is configured to sense its internal temperature and disconnect itself from the power storage system if a temperature limit is exceeded. Overheating of the batteries can lead to suboptimal system performance, decreased battery state of health, and shortened battery life. Because the batteries may not include active cooling systems, it may take several hours for an overheated battery to return to a safe operating temperature, thus posing a risk that the marine vessel is stranded due to a lack of power supply to the electric marine propulsion system. The only way to ensure that the batteries do not overheat and disconnect themselves from the power storage system is to reduce the power limits of the batteries as they approach their temperature limits. Such a reduction in power supplied by the batteries will result in a reduced torque output by the electric motor(s) of the propulsion system, but a reduction in torque output is generally always preferable to disabling of the marine vessel that would otherwise occur if the batteries were allowed to exceed operational temperature limits.

In view of the forgoing challenges relating to power management for electric marine propulsion systems, the inventors developed the disclosed system and method for managing power drawn by propulsion devices from a power storage system comprising at least one battery, such as two or more batteries connected in parallel. The system is configured to use a temperature and power level of each battery to determine a temperature compensated power offset value, and to subtract the sum of the offset values from a system power limit, resulting in a temperature compensated system power limit. The electric motor(s) of the propulsion system are then controlled so that the temperature compensated system power limit is not exceeded.

Figure 1:
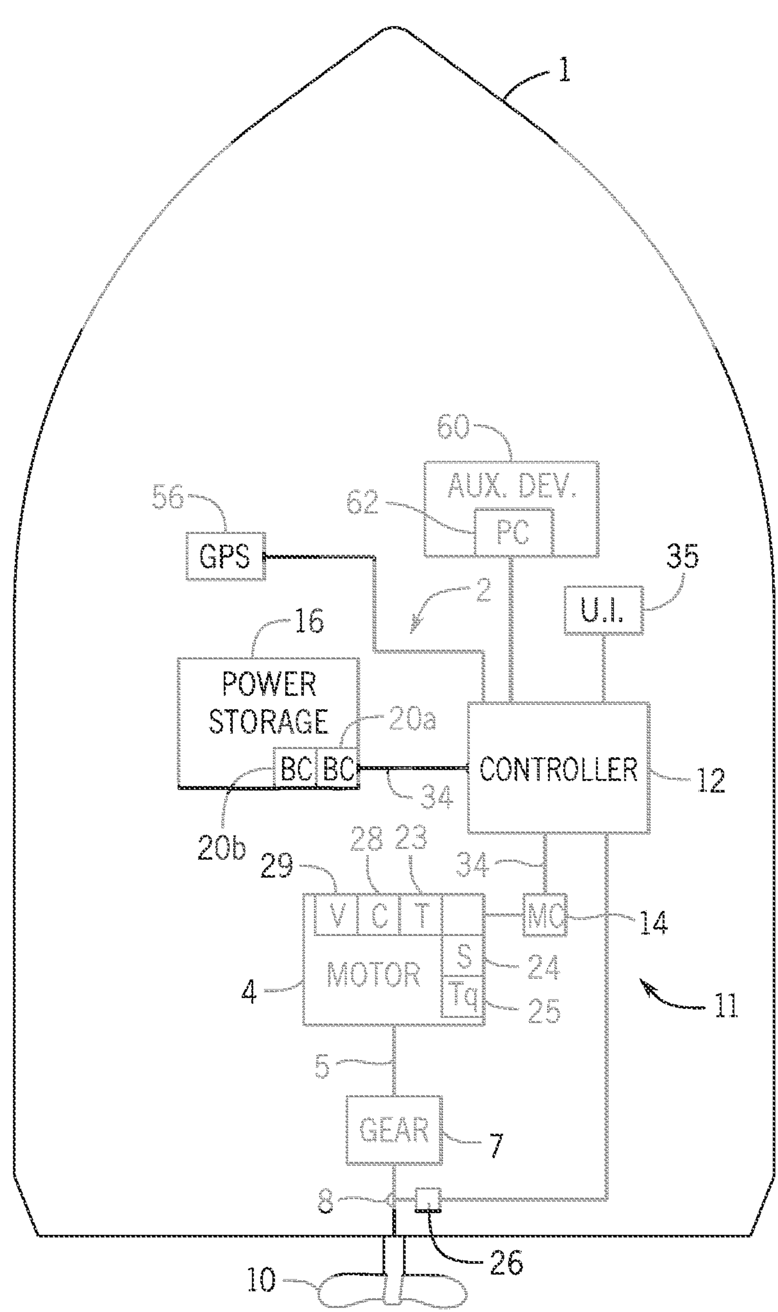
FIG. 1 is a schematic depiction of a marine vessel having an exemplary electric marine propulsion system in accordance with the present disclosure.
Figure 2:
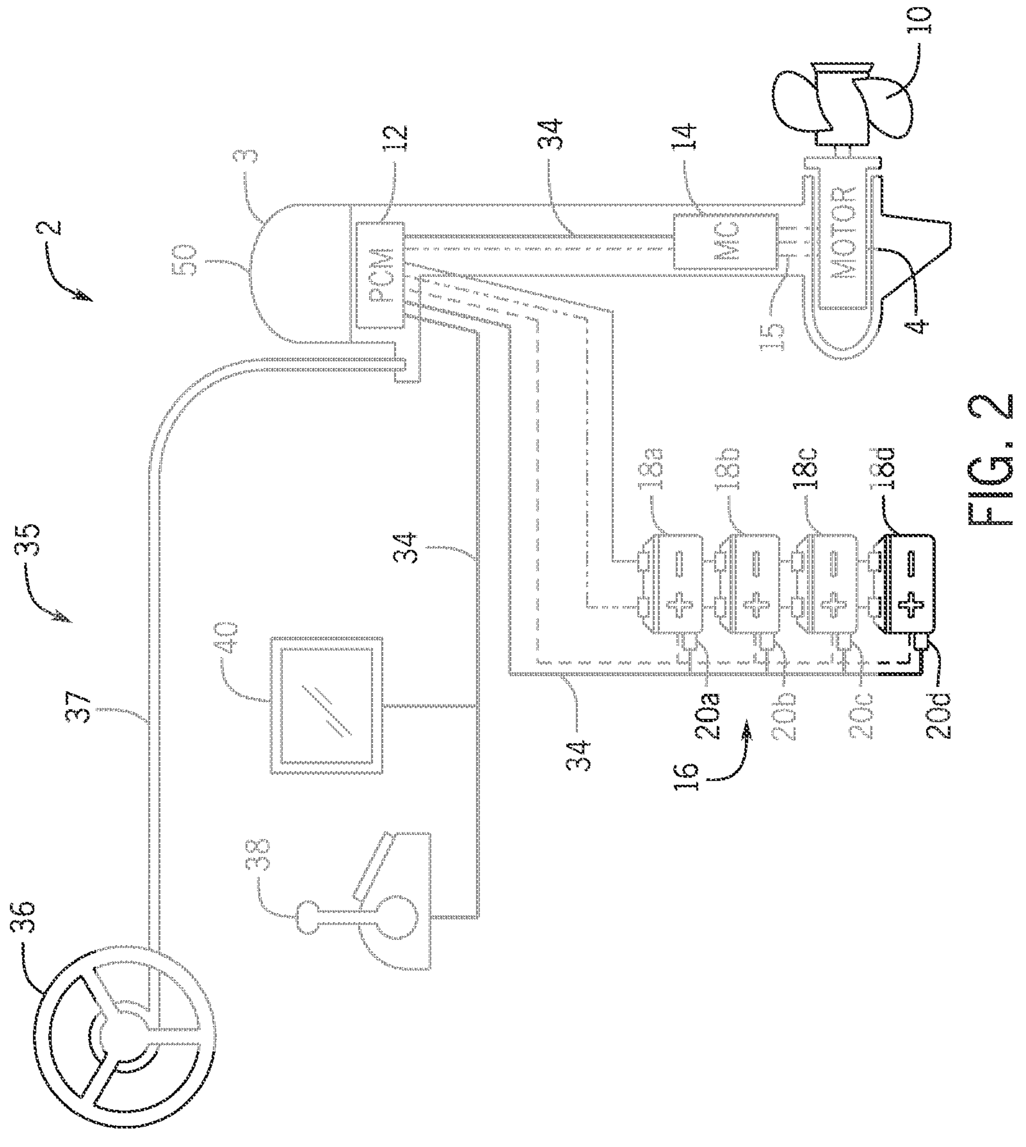
FIG. 2 depicts another exemplary electric marine propulsion system in accordance with the present disclosure.

FIG. 1 depicts an exemplary embodiment of a marine vessel 1 having an electric marine propulsion system 2 configured to propel the marine vessel in a direction instructed by an operator via a steering control system, or by a guidance system configured to automatically control steering of the marine vessel to steer the vessel toward a predetermined location or global position. Referring also to FIG. 2, embodiments of the electric propulsion system 2 include at least one electric marine drive 3 having an electric motor 4 configured to propel the marine vessel 1 by rotating a propeller 10, as well as a power storage system 16, and a user interface system 35. In the depicted embodiment of FIG. 2, the electric marine propulsion system 2 includes an outboard marine drive 3 having an electric motor 4 housed therein, such as housed within the cowl 50 of the outboard marine drive. A person of ordinary skill in the art will understand in view of the present disclosure that the marine propulsion system 2 may include other types of electric marine drives 3, such as inboard drives or stern drives. The electric marine drive 3 is powered by the scalable storage device 16, such as including a plurality of batteries 18 connected in parallel.

The electric marine propulsion system 2 may include one or a plurality of electric marine drives 3, each comprising at least one electric motor 4 configured to rotate a propulsor, or propeller 10. The motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. In certain embodiments, the electric motor 4 includes a rotor and a stator in a known configuration.

The electric motor 4 is electrically connected to and powered by a power storage system 16. The power storage system 16 stores energy for powering the electric motor 4 and is rechargeable, such as by connection to shore power when the electric motor 4 is not in use. Various power storage devices a d systems are known in the relevant art. The power storage system 16 may be a battery system including a plurality of batteries 18 or banks of batteries. For example, the power storage system 16 may include a plurality of lithium-ion (LI) batteries 18, each LI battery 18 comprised of multiple battery cells. In other embodiments, the power storage system 16 may include a plurality of lead-acid batteries 18, fuel cells, flow batteries, ultracapacitors, and/or other devices capable of storing and outputting electric energy.

Each battery 18a-18d may include an associated battery controller 20a-20d configured to identify a battery charge level and other battery parameters for that battery, such as battery temperature, and to determine a power limit for that battery based on the charge level (e.g., battery state of charge and/or battery voltage), battery temperature, battery current, battery state of health, etc. Each controller 20a-20d may also be configured to control whether the respective battery 18a-18d is connected to deliver power, and thus active, or is inactive and disconnected from and not delivering power to the marine drive(s) 3. For example, if the power limit for the battery 18a-18d is exceed, such as by a threshold amount or for a threshold period of time, then the controller 20a-20c may be configured to disconnect the battery 18a-18d in order to protect it from damage. Where a battery 18a-18d is in an inactive state, the respective controller 20a-20d may be configured to communicate a power limit of zero and/or to communicate an error indicating that the battery 18a-18d is not active or available to provide power.

The electric motor 4 is operably connected to the propeller 10 and configured to rotate the propeller 10. As will be known to the ordinary skilled person in the relevant art, the propeller 10 may include one or more propellers, impellers, or other propulsor devices and that the term "propeller" may be used to refer to all such devices. In certain embodiments, such as that represented in FIG. 1, the electric motor 4 may be connected and configured to rotate the propeller 10 through a gear system 7 or a transmission. In such an embodiment, the gear system 7 translates rotation of the motor output shaft 5 to the propeller shaft 8 to adjust conversion of the rotation and/or to disconnect the propeller shaft 8 from the drive shaft 5, as is sometimes referred to in the art as a "neutral" position where rotation of the drive shaft 5 is not translated to the propeller shaft 8. Various gear systems 7, or transmissions, are well known in the relevant art. In other embodiments, the electric motor 4 may directly connect to the propeller shaft 8 such that rotation of the drive shaft 5 is directly transmitted to the propeller shaft 8 at a constant and fixed ratio.

The power storage system 16 may further include a battery controller 20a-20d for each battery 18a-18d in the system, each battery controller 20a-20d configured to monitor and/or control the respective battery. The battery controller 20a-20d is be configured to receive information from current, voltage, and/or other sensors within the respective battery 18a-18d, such as to receive information about the voltage, current, and temperature of each battery cell or group of battery cells. For example, the battery controller 20a-20d may receive inputs from one or more sensors, such as one or more voltage, current, and temperature sensors within a housing for the battery 18a-18d. Voltage sensors may be configured to sense voltage within the battery (such as cell voltage sensors configured to sense the voltage of individual cells or groups of cells in a LI battery) and one or more temperature sensors may be configured to sense a temperature within a housing. The battery controller 20a-20d is configured to calculate a charge level, such as a state of charge and/or a voltage (such as an open circuit voltage), of the battery 18a-18d, and may also be configured to determine a battery state of health and a current temperature for the battery 18a-18d. The battery controller 20a-20d may be further configured to determine a power limit for the battery 18a-18d, which is an amount of power that the battery 18a-18d can supply without overheating, over discharging, or otherwise compromising the battery. The battery controllers 20a-20d may be configured to communicate those values via a communication link 34 to other control devices in a control system 11.

A control system 11 controls the electric marine propulsion system 2, wherein the control system 11 may include a plurality of control devices configured to cooperate to provide the method of controlling the electric marine propulsion system described herein. For example, the control system 11 includes a central controller 12, a plurality of battery controllers 20a-20d, and one or more motor controllers 14, trim controllers, steering controllers, etc. communicatively connected, such as by a communication bus. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected.

Each controller may comprise a processor and a storage device, or memory, configured to store software and/or data utilized for controlling and or tracking operation of the electric propulsion system 2. The memory may include volatile and/or non-volatile systems and may include removable and/or non-removable media implemented in any method or technology for storage of information. The storage media may include non-transitory and/or transitory storage media, including random access memory, read only memory, or any other medium which can be used to store information and be accessed by an instruction execution system, for example. An input/output (I/O) system provides communication between the control system 11 and peripheral devices.

Each electric motor 4 may be associated with a motor controller 14 configured to control power to the electric motor, such as to the stator winding thereof. The motor controller 14 is configured to control the function and output of the electric motor 4, such as controlling the torque outputted by the motor, the rotational speed of the motor 4, as well as the input current, voltage, and power supplied to and utilized by the motor 4. In one arrangement, the motor controller 14 controls the current delivered to the stator windings via the leads 15, which input electrical energy to the electric motor to induce and control rotation of the rotor.

In certain embodiments, various sensing devices 23-25, 26, and 28-29, may be configured to communicate with a local controller, such as the motor controller 14 or battery controller 20a-20d, and in other embodiments the sensors 23-25, 26, and 28-29 may communicate with the central controller 12 and one or more of the motor controller 14 and or battery controller 20a-20d may be eliminated. A GPS system 55 may also be configured to determine a current global position of the vessel, track vessel position over time, and/or determine vessel speed and direction of travel, and to provide such information to the controller 12. Alternatively or additionally, vessel speed may be measured by a speed-over-water sensor such as a pitot tube or a paddle wheel and such information may be provided to the controller 12. Controllers 12, 14, 20a-20d (and or the various sensors and systems) may be configured to communicate via a communication bus such as a CAN bus or a LIN bus, or by single dedicated communication links between controllers 12, 14, 20a-20d.

Sensors may be configured to sense the power, including the current and voltage, delivered to the motor 4. For example, a voltage sensor 29 may be configured to sense the input voltage to the motor 4 and a current sensor 28 may be configured to measure input current to the motor 4. Accordingly, power delivered to the motor 4 can be calculated and such value can be used for monitoring and controlling the electric propulsion system 2, including for monitoring and controlling the motor 4. In the depicted example, the current sensor 28 and voltage sensor 29 may be communicatively connected to the motor controller 14 to provide measurement of the voltage supplied to the motor and current supplied to the motor. The motor controller 14 is configured to provide appropriate current and or voltage to meet the demand for controlling the motor 4. For example, a demand input may be received at the motor controller 14 from the central controller 12, such as based on an operator demand at a helm input device, such as the throttle lever 38. In certain embodiments, the motor controller 14, voltage sensor 29, and current sensor 28 may be integrated into a housing of the electric motor 4, in other embodiments the motor controller 14 may be separately housed.

Various other sensors may be configured to measure and report parameters of the electric motor 4. For example, the electric motor 4 may include means for measuring and or determining the torque, rotation speed (motor speed), current, voltage, temperature, vibration, or any other parameter. In the depicted example, the electric motor 4 includes a temperature sensor 23 configured to sense a temperature of the motor 4, a speed sensor 24 configured to measure a rotational speed of the motor 4 (motor RPM), and a torque sensor 25 for measuring the torque output of the motor 4. A propeller speed sensor 26 may be configured to measure a rotational speed of the propeller shaft 8, and thus rotational speed of the propeller 10. For example, the propeller speed sensor 26 and/or the motor speed sensor 24 may be a Hall Effect sensor or other rotation sensor, such as using capacitive or inductive measuring techniques. In certain embodiments, one or more of the parameters, such as the speed, torque, or power to the electric motor 4, may be calculated based on other measured parameters or characteristics. For example, the torque may be calculated based on power characteristics in relation to the rotation speed of the electric motor, for example.

The central controller 12, which in the embodiment shown in FIG. 2 is a propulsion control module (PCM), communicates with the motor controller 14 via communication link 34, such a serial communication bus or other type of communication network (which may be a wired or wireless network implementation). To provide one example, the communication link 34 may be a CAN bus, such as a Kingdom Network. The controller also receives input from and/or communicates with one or more user interface devices in the user interface system 35 via the communication link, which in some embodiments may be the same communication link as utilized for communication between the controllers 12, 14, 20*a*-20*d* or may be a separate communication link. The user interface devices in the exemplary embodiment include a throttle lever 38 and a display 40. In various embodiments, the display 40 may be, for example, part of an onboard management system, such as the VesselView™ by Mercury Marine of Fond du Lac, Wisconsin. A steering wheel 36 is provided, which in some embodiments may also communicate with the controller 12 in order to effectuate steering control over the marine drive 3, which is well-known and typically referred to as steer-by-wire arrangements. In the depicted embodiment, the steering wheel 36 is a steer arrangement where the steering wheel 36 is connected to a steering actuator that steers the marine drive 3 by a steering cable 37. Other steer arrangements, such as various steer-by-wire arrangements, are well-known in the art and could alternatively be implemented.

The various parameters of the electric propulsion system are utilized for providing user-controlled or automatically effectuated vessel power control functionality appropriate for optimizing power usage. The system may be configured to control power usage by the electric propulsion system 2 to prevent overdrawing any one of the plurality of batteries 18*a*-18*d*. In one embodiment, the control system 11 modulates the motor output, such as by controlling the amount of current that the motor 4 is drawing, so that a power limit from any one of the plurality of batteries will not be exceeded. Where the batteries are connected in parallel, modulation of the motor 4 output impacts all the batteries 18*a*-18*d* that are active, and thus available to power the motor 4, and cannot be targeted at only changing the power draw from certain active batteries.

The power storage system 16 may further be configured to power auxiliary devices 60 on the marine vessel 1 that are not part of the propulsion system 2. For example, the auxiliary devices may include a bilge pump, a cabin lights, a stereo system or other entertainment devices on the vessel, a water heater, a refrigerator, an air conditioner or other climate/comfort control devices on the vessel, communication systems, navigation systems, or the like. Some or all of these accessory devices are sometimes referred to as a "house load" and may consume a substantial amount of battery power.

In certain embodiments, the control system 11 may be configured to determine a portion of the load available for propulsion based on the load amount being used by the auxiliary devices, and may be configured to control the motor 4 accordingly so that the total power draw does not exceed the power limit, including the power draw from the propulsion system 2 and from the auxiliary devices 60. The power consumption by some or all of the auxiliary devices may be monitored, such as by one or more power controllers 62 associated with one or a group of auxiliary devices (FIG. 1). The power controller 62 is communicatively connected to the controller 12 or is otherwise communicating with one or more controllers in the control system 11 to communicate information about power consumption by such auxiliary devices. For example, the power controller 62 may be configured to communicate with one or more power monitoring or other control devices via CAN bus or LIN bus. The control system 11 is thus configured to determine an available load that can be used for propulsion by subtracting the auxiliary power draw value representing power drawn by one or more auxiliary devices from the system power limit to determine an available power, where the at least one electric motor is controlled so as not to consume more than the available power.

Alternatively or additionally, the control system 11 may be configured to control power to one or more auxiliary devices in order to enable better power allocation and reserve more power for the propulsion device, such as during periods of high propulsion demand from the user and/or when the available power from the power storage system 16 falls below a threshold. For example, the power consumption by some or all of the auxiliary devices may be controllable by the power controller 62 associated with each controlled auxiliary device or a group of auxiliary devices (FIG. 1). The power controller 62 may be configured to receive instructions from the central controller 12 or other control device(s) in the control system 11 via CAN bus or LIN bus, and to then control operation of the auxiliary device and/or power delivery to the auxiliary device according to received instructions.

For instance, the system may be configured to reduce power delivery to the device(s) 60, or to selectively turn off the auxiliary device(s) 60 by turning on or off power delivery to the device(s) 60 associated with the power controller 62 based on the system power limit and the power needed for propulsion. The power controller 62 may be configured to instruct power-down of the auxiliary device or to otherwise cut power thereto to turn off one or more auxiliary devices 60. Alternatively or additionally, the power controller 62 for one or a set of auxiliary devices may include a battery switch controlling power thereto. The control system 11 may thus include digital switching system configured to control power to the various auxiliary devices, such as a CZone Control and Monitoring system by Power Products, LLC of Menomonee Falls, WI. Other examples of power control arrangements are further exemplified and described at U.S. application Ser. Nos. 17/009,412 and 16/923,866, which are each incorporated herein by reference in its entirety.

The control system 11 may be configured to select certain auxiliary device(s) 60 that get turned off or otherwise controlled to reduce or eliminate power consumption by those device(s). For example, the controller 12 may be configured with a list of one or more auxiliary devices 60 that gets turned off under certain conditions, such as when the available power from the power storage system 16 falls below certain thresholds and/or based on user input indicating a desire from maximizing power available for propulsion. Each power level threshold, for example, may be associated with one or more lists of auxiliary device(s) 60 that gets turned off, and similarly differing lists may be associated with various battery charge levels and/or with various distance error values. For example, the system 11 may be configured to turn off certain non-essential auxiliary devices that are not essential to the operation of the propulsion system when the battery total charge level of the available batteries reaches a low threshold. For example, those devices that are not important for optimized vessel operation, such as entertainment devices or other accessories, or non-essential devices that draw signification power, such as climate control devices and water heaters, may be automatically turned off by the control system or the user interface display may be controlled to instruct a user to turn off one or more of such devices. Similarly, the system may be configured to facilitate user input instructing prioritization of propulsion for power consumption, where power to auxiliary devices 60 is limited based on the amount of power needed to meet user propulsion demand.

Figure 3:
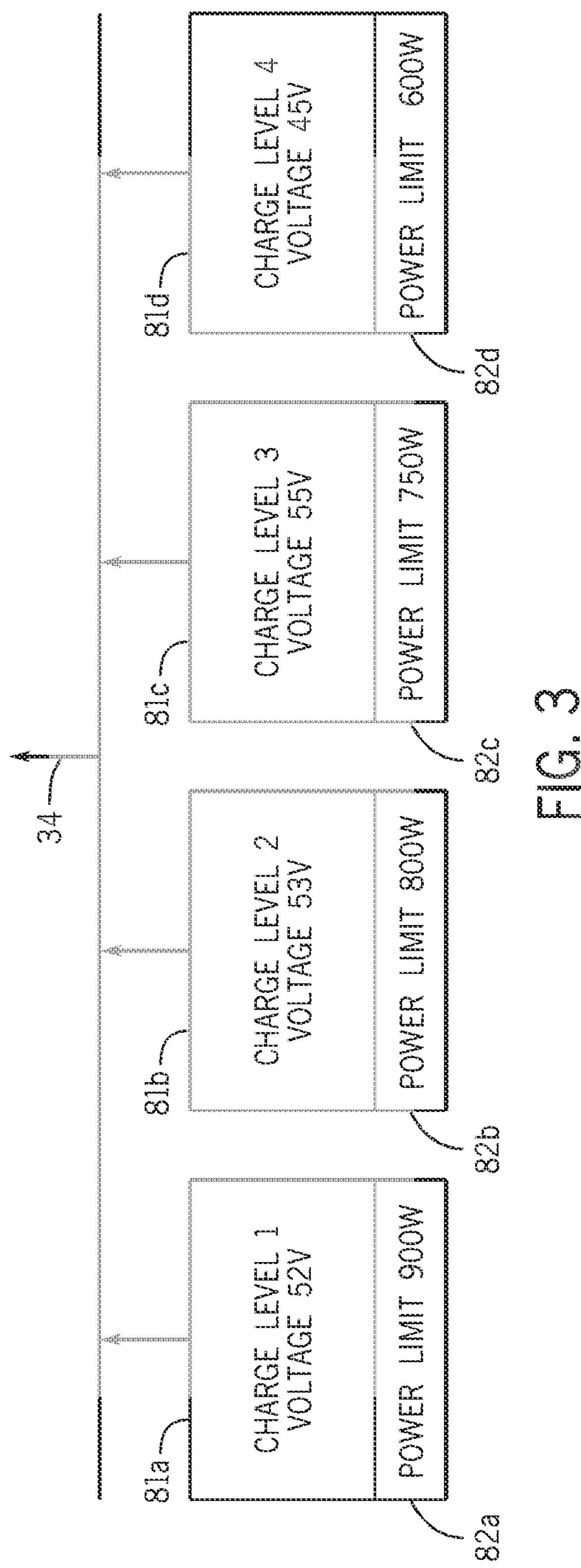
FIG. 3 illustrates a set of charge levels and power limits for each of a plurality of batteries.
Figure 4:
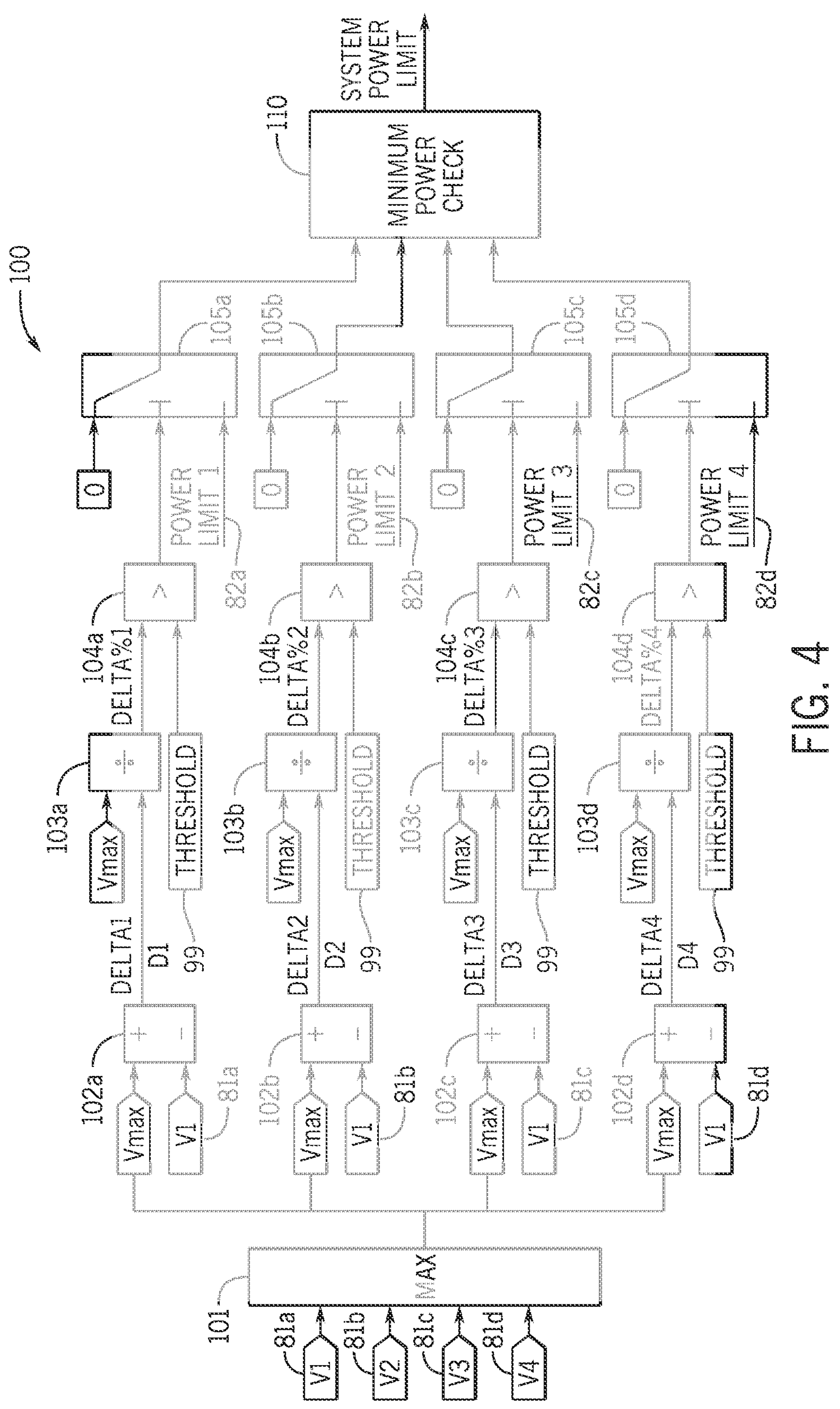
FIG. 4 is a control diagram illustrating an exemplary method for controlling an electric marine propulsion system in accordance with the present disclosure.
Figure 5:
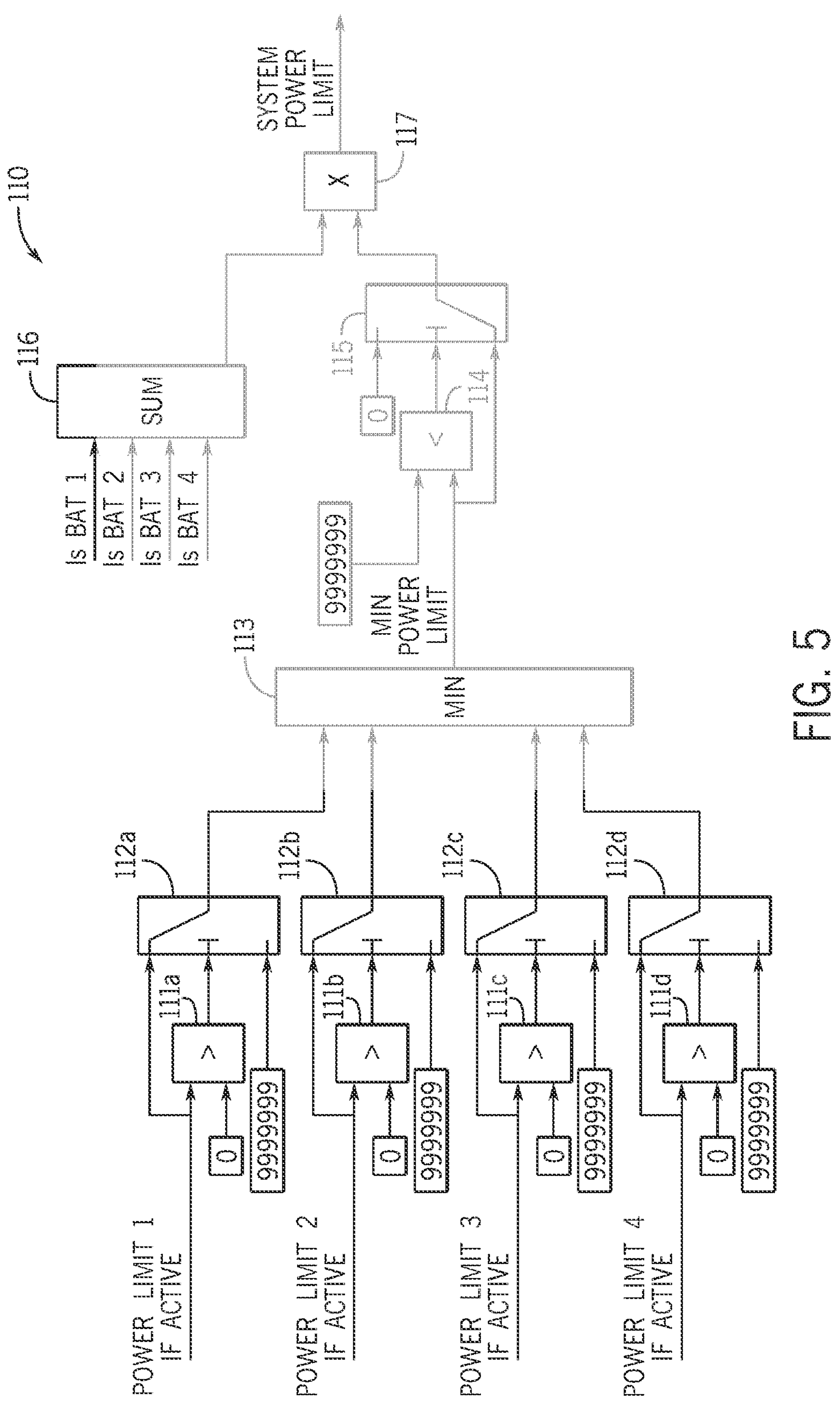
FIG. 5 is control diagram illustrating exemplary steps for determining a system power limit in accordance with the present disclosure.

The control diagrams at FIGS. 3-5 illustrate exemplary control routines executed by the control system 11 for controlling the propulsion system 2. FIG. 3 illustrates exemplary battery charge level information and power limit information determined for each of four batteries (e.g., 18*a*-18*d*), such as by battery controllers (e.g., 20*a*-20*d*). A charge level 81*a*-81*d* is determined for each of the four batteries 18*a*-18*d* and communicated via communication link 34, such as to a central controller 12 configured to identify which batteries are active and determine a system power limit accordingly. The charge level 81*a*-81*d* may be a state of charge value, a voltage value (such as an open circuit voltage for the battery), and/or any other value indicating the amount of power stored and available to be supplied by that battery. A power limit value 82*a*-82*d* is also determined for each battery 18*a*-18*d* and communicated along with the charge level information. For example, each battery controller 20*a*-20*d* may be configured to determine the power limit for the respective battery based on the charge level for that battery and other information, including battery temperature. If the battery is running hot, the power limit will be reduced so as to avoid overheating the battery and may be significantly reduced, such as set to zero, if the battery is at sever risk of overheating. Other factors, such as battery state of health, may also impact the power limit determination by each battery controller 20*a*-20*d*.

In the example at FIG. 3, a first charge level 81*a* and a first power limit 82*a*, are associated with a first battery 18*a* in the power storage system 16. Similarly, a second charge level 81*b* and a second power limit 82*b* are associated with a second battery 18*b*; a third charge level 81*c* and third power limit 82*c* are associated with a third battery 18*c*; and a fourth charge level 81*d* and fourth power limit 82*d* are associated with a fourth battery 18*d*. The power limit 82*a*-82*c* is determined as a limit on the amount of power that battery can provide, which may be based on one or more of the battery charge level (e.g., battery voltage and/or battery state of charge) and the battery temperature. Battery temperatures of batteries in the storage system 16 may vary from one another, such as based on environmental conditions (e.g., one or a subset of batteries is in the sun or closer to a heat-generating device or system) or conditions of that battery (e.g., being subjected to greater power draw). In the scenario illustrated in FIG. 3, battery 18*c* has the lowest power limit 82*c* despite having a higher charge level 81*c*. This may be due, for example, to environmental temperature conditions or recent power draw conditions of that battery 18*c*. In the depicted example, the charge level values are depicted in volts and the power limit values are depicted in watts; however, these units are merely exemplary and other values and corresponding units of measure may be utilized for the charge level and/or power limit values utilized by the system.

The battery charge levels 81*a*-81*d* and power limits 82*a*-82*d* are provided as inputs to the control method 100 exemplified at FIGS. 4 and 5. In FIG. 4, steps are executed to determine which of the plurality of batteries 18*a*-18*d* are active batteries and then to determine a system power limit based thereon. The charge levels 81*a*-81*d* are assessed to determine a highest charge level at logic step 101, which is the greatest of the charge level values 81*a*-81*d* for the plurality of batteries 18*a*-18*d* in the power storage system 16. In the exemplary battery values shown at FIG. 3, the third charge level 81*c* is the highest charge level, at 55 volts.

The highest charge level, referred to here as Vmax, is provided to logic step 102, where a charge level delta is determined between the highest charge level and the charge level for each battery, respectively. A first charge level delta D1 is determined at logic step 102*a* as a difference between Vmax and the first charge level 81*a* for the first battery 18*a*. A second charge level delta D2 is determined at logic step 102*b* as a difference between the highest charge level Vmax and the second charge level 81*b* for the second battery 18*b*. A third charge level delta D3 is determined at logic step 102*c* as a difference between the highest charge level Vmax and the third charge level 81*c* for the third battery 18*c*. A fourth charge level delta D4 is determined at logic step 102*d* as the difference between the highest charge level Vmax and the fourth charge level 81*d* for the fourth battery 18*d*.

Each charge level delta D1-D4 are compared to a threshold delta to determine whether the batteries will be utilized as active batteries or disconnected due to the comparatively low charge level. In the depicted example, the threshold delta is a percentage value, and thus an initial logic step 103 is executed to determine a percentage value for each of D1-D4. Namely, steps 103*a*-103*d* are executed to divide Vmax by the respective delta value to generate a charge level percent delta for each of the plurality of batteries 18*a*-18*d*. Each charge level percent delta is compared to the predetermined threshold delta 99 at steps 104*a*-104*d*. If the charge level percent delta is less than the threshold delta 99, then the respective battery is determined to be active. If the charge level percent delta is greater than the threshold, then an error is generated and the respective battery is considered inactive. Thus, if the charge level 81*a*-81*d* for each respective battery is close enough to the highest charge level, then the battery is deemed active. If any of the charge levels 81*a*-81*d* is not sufficiently close in value to the highest charge level, and thus the threshold delta is exceeded, then the battery will be deemed inactive and not utilized for determining the power availability from the system and the system power limit. Batteries with charge levels that are significantly below those of other batteries will be turned off and not utilized.

The power limits 82*a*-82*d* are provided and analyzed at logic steps 105*a*-105*d*, where the system is configured to generate a power limit of zero for inactive batteries and pass the respective power limit values 82*a*-82*d* for active batteries. Thus, for any active battery, the power limit will be a non-zero value. For inactive batteries, a zero power limit value is outputted from the respective logic block 105*a*-105*d*. Referring to the exemplary values shown in FIG. 4 to illustrate, the fourth charge level value 81*d* is greater than the threshold delta from the highest charge level, which in the example is third charge level 81*c*, and thus the fourth battery will be determined inactive and a value of zero will be passed at logic step 105*d* rather than passing the fourth power limit value 82*d*. Thus, the fourth power limit value 82*d*, which is the lowest power limit overall, will not be considered when determining the system power limit because, for the time being, that battery will not participate in powering the system. The remaining three power limit values 82*a*-82*c* will be passed, and thus non-zero values will be provided for those three batteries to the system power limit module 110, where steps are executed to determine the system power limit.

FIG. 5 depicts exemplary steps for determining the system power limit, and thus one embodiment of method steps performed by the system power limit module 110. The values determined at steps 105*a*-105*d* are received as inputs, where the power limits 82*a*-82*d* are provided for all active batteries and a zero or null value is provided if the battery is not active. Steps 111*a*-111*d* are a preliminary check for inactive batteries. Where zero or null values are provided, comparative logic step 111*a*-111*d* will generate a false or null value. Where a positive, non-zero power limit value is provided, the corresponding logic step 111*a*-111*d* will generate a true or one value. If the output at step 111*a*-111*d* is true, then the corresponding logic gate 112*a*-112*d* will pass a non-zero positive power limit value. If the output of any of steps 111*a*-111*d* is false, then the corresponding logic gate 112*a*-112*d* will pass a high edge case value, or high placeholder value.

The outputs of logic step 112*a*-112*d* are provided to logic step 113 where a minimum power limit for the active batteries is identified as the lowest input value. Referring again to the exemplary inputs shown in FIG. 3, where the battery associated with power limit 82*d* is determined to be inactive, the first through third power limits 82*a*-82*c* will be assessed at step 113. Power limit 82*c* for the third battery 18*c* is the lowest and thus will be selected as the minimum power limit for the active batteries. As mentioned above, the comparatively low power limit of the third battery 18*c* despite its higher charge level may be due, for example, to comparatively higher environmental temperature conditions for that battery or comparatively high power draw conditions of that battery 18*c* which may cause an increase in the internal temperature of the third battery 18*c*.

Logic steps 114 and 115 are included to ensure that the minimum power limit outputted from step 113 is a real value. If not, logic gate 115 will output zero, and the system power limit will be zero. Otherwise, logic gate 115 will output the minimum power limit. Logic step 116 is configured to determine the number of active batteries. The system power limit is then determined at step 117 by multiplying the minimum power limit by the number of active batteries.

Figure 6:
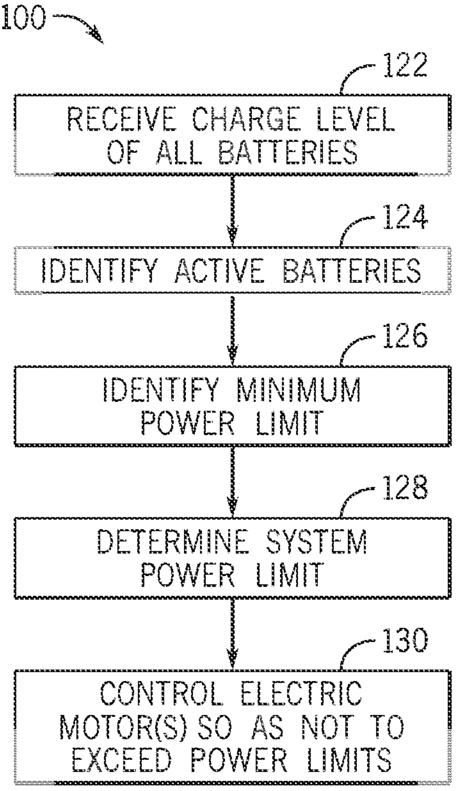
FIG. 6 is a flow chart depicting another exemplary method for controlling an electric marine propulsion system in accordance with the present disclosure.

FIG. 6 is a flow chart depicting an exemplary method 100 for controlling an electric marine propulsion system so as not to exceed a power limit determined as described herein. Charge levels of all batteries in the power storage system 16 are received at step 122. Active batteries are identified from the plurality of batteries (e.g., 18*a*-18*d*) in the power storage system 16 are identified at step 124 based at least in part on the charge level of each of the plurality of batteries. For example, the active batteries may be identified based on a comparison of the charge levels relative to one another, as is described above. The minimum power limit is then identified at step 126, such as the lowest power limit for any one of the active batteries. The system power limit is then determined at step 128 based on the minimum power limit and the number of active batteries to be used to power the electric motor.

The one or more electric motors in the electric marine drives 3 are then controlled at step 130 so as not to exceed the power limit. For example, the motor controller 14 may be configured to limit a power draw, such as by limiting a current draw, from the electric motor 4 so as not to exceed the system power limit. Alternatively, the control system may be configured to impose a demand limit based on the system power limit, where user demand values greater than the demand limit are not effectuated, thereby preventing the system power limit from being exceeded and preventing overdrawing power from any one of the plurality of batteries in the power storage system 16. For example, each calculated system power limit value may be associated with a respective demand limit.

In some embodiments, the control system 11 may be further configured to account for power drawn by one or more auxiliary devices 60 in effectuating the system power limit such that a total power draw by the at least one electric motor and other devices does not exceed the system power limit. For example, the auxiliary power may be subtracted from the system power limit and the at least one electric motor 4 may be controlled so as not to exceed that remaining available power value such that the total power usage by all devices connected to the power storage system 16 does not exceed the system power limit.

Figure 7:
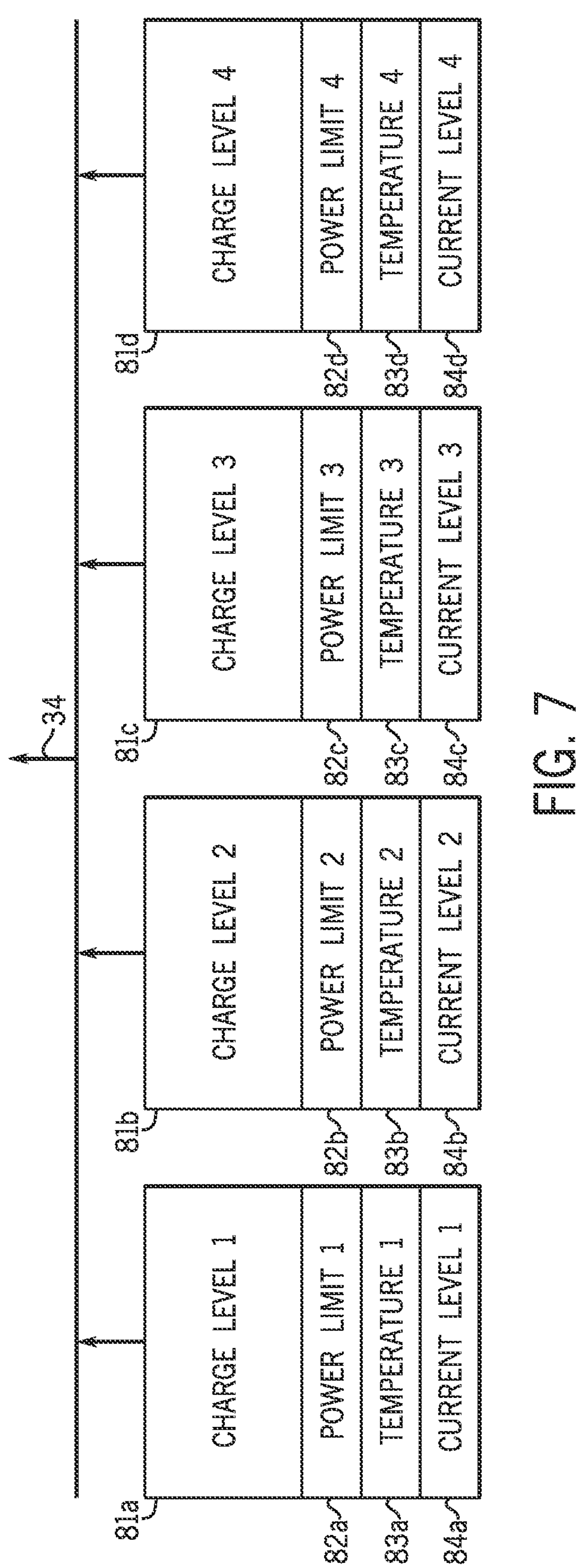
FIG. 7 illustrates a set of charge levels, power limits, temperatures, and current levels for each of a plurality of batteries.

The control diagrams at FIGS. 7-11 illustrate additional exemplary control routines executed by the control system 11 for controlling the propulsion system 2. FIG. 7 illustrates exemplary battery temperature and current level information determined for each of four batteries (e.g., 18*a*-18*d*), such as by battery controllers (e.g., 20*a*-20*d*), in addition to the battery charge level 81*a*-81*d* and power limit 82*a*-82*d* information described above with reference to FIG. 3. A battery temperature 83*a*-83*d* is determined for each of the four batteries 18*a*-18*d* and communicated via communication link 34, such as to a central controller 12. The battery temperature 83*a*-83*d* may be an enclosure temperature value, or any other value indicating the temperature experienced by the battery. In general, the maximum safe operating temperature for the batteries 18*a*-18*d* may be in the range from 45-70° C. As described above, battery temperatures 83*a*-83*d* of batteries in the storage system 16 may vary from one another, such as based on environmental conditions (e.g., one or a subset of batteries is in the sun or closer to a heat-generating device or system) or conditions of that battery (e.g., being subjected to greater power draw). A current level 84*a*-84*d* is further determined for each of the four batteries 18*a*-18*d* and communicated along with the temperature information. The current level 84*a*-84*d* may be any value indicating amount of current available to be supplied by that battery. For example, the current level information may be sensed by a current sensor, or each battery controller 20*a*-20*d* may be configured to determine the current level for the respective battery based on the charge level and power level for that battery.

Figure 8:
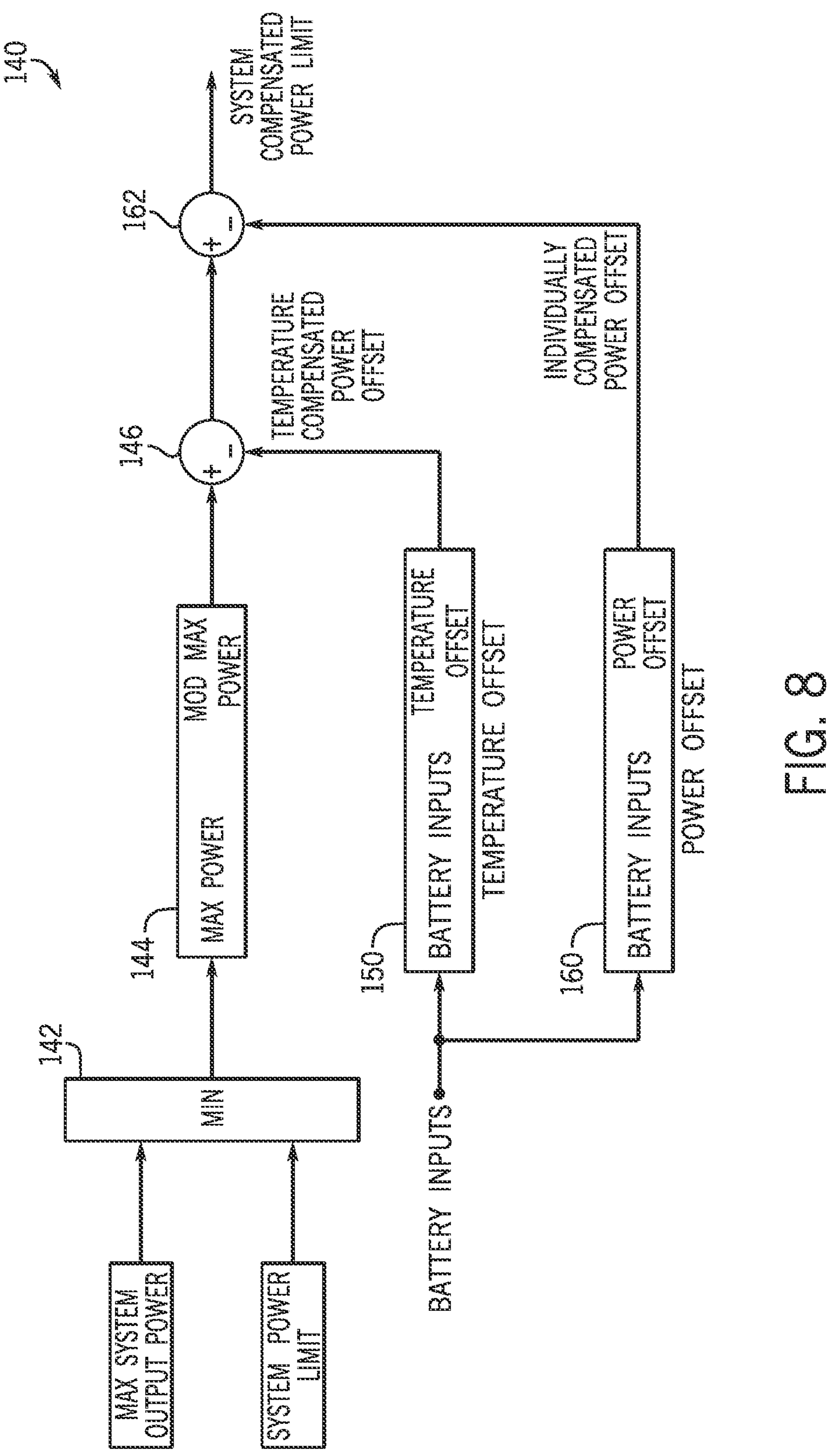
FIG. 8 is a control diagram illustrating exemplary steps for determining a battery temperature compensated system power limit in accordance with the present disclosure.

The battery charge levels 81*a*-81*d*, power limits 82*a*-82*d*, temperatures 83*a*-83*d*, and current levels 84*a*-84*d* are provided as inputs to the control method 140 exemplified at FIG. 8. Control method 140 provides a temperature compensated system power limit value for operating the electric propulsion system 2 that ensures that none of the batteries 18*a*-18*d* in the storage system 16 will exceed a temperature limit. As will be described in further detail below, the power limits 82*a*-82*d* and temperatures 83*a*-83*d* are specifically provided to temperature offset control method 150 shown in FIGS. 8 and 9, while the battery charge levels 81*a*-81*d*, power limits 82*a*-8*d*, temperatures 83*a*-83*d*, and current levels 84*a*-84*d* are each specifically provided to power offset control method 160 shown in FIGS. 8 and 10.

A maximum system output power and a system power limit are shown to be provided to logic step 142 of FIG. 8. The maximum system output power may be stored in the central controller 12, while the system power limit is determined per the control methods 100 and 110 described above with reference to FIGS. 4-6. Logic step 142 is provided as a check to ensure that the system power limit as calculated per the control methods 100 and 110 does not exceed the maximum system output power, thus logic step 142 will pass the lower of the two values (maximum system output power or calculated system power limit) through to step 144, which may adjust the power limit during an overboost condition to allow additional torque for short transients, and logic step 146.

Figure 9:
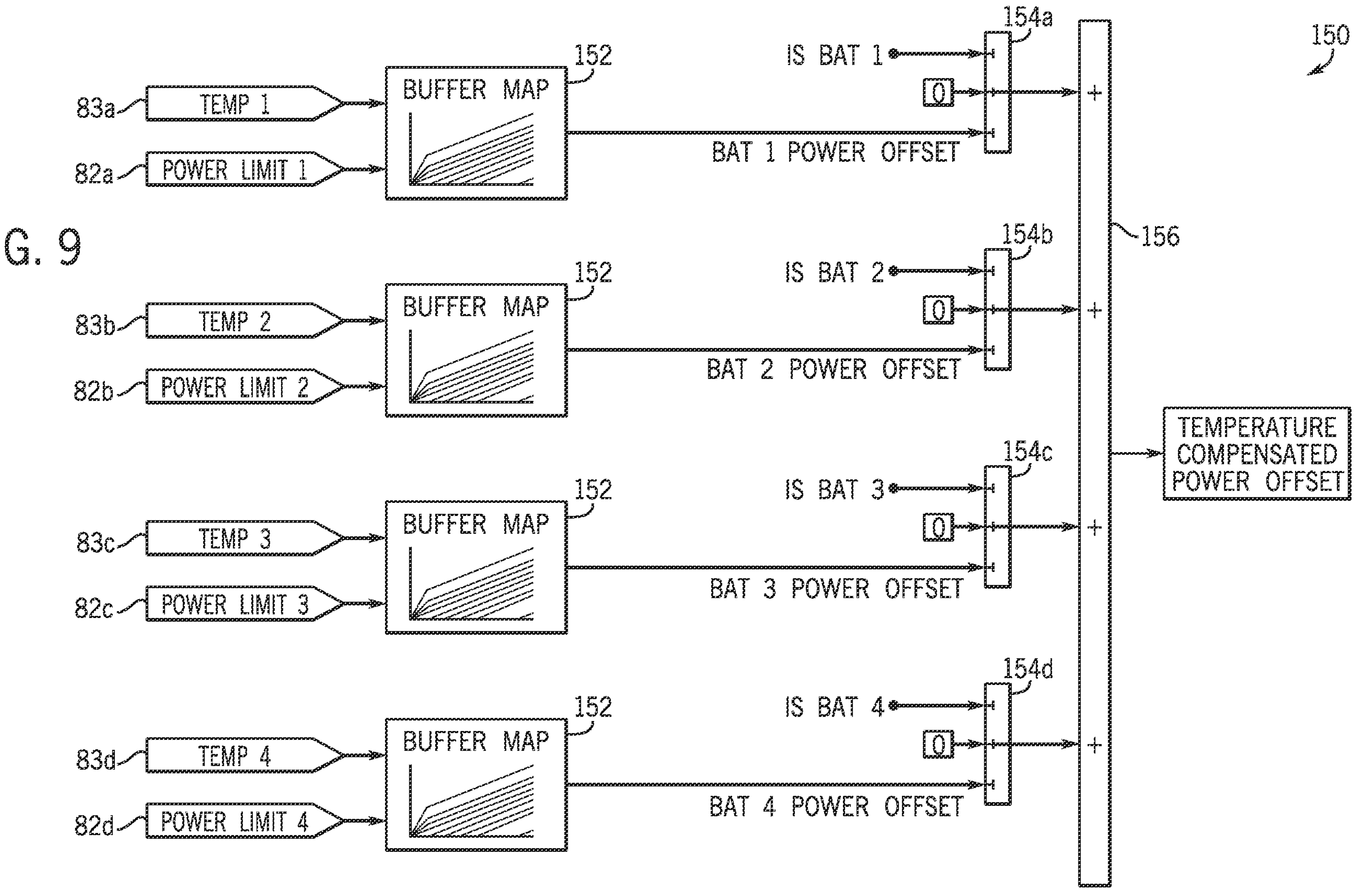
FIG. 9 is a control diagram illustrating exemplary steps for determining a battery temperature offset power value for a plurality of batteries in accordance with the present disclosure.

A temperature compensated system power limit is determined at logic step 146 by subtracting a temperature compensated power offset value from the system power limit passed through to step 144. The temperature compensated power offset value is determined by control method 150, depicted specifically in FIG. 9. As shown in FIG. 9, a power limit 82*a*-82*d* and a temperature 83*a*-83*d* for each of the four batteries 18*a*-18*d* are supplied as inputs to a temperature and power buffer map 152. The temperature and power buffer map 152 outputs a power offset value for the battery. In general, the higher the temperature of the battery, the greater the power offset value generated by the buffer map 152. The characteristics of the temperature and power buffer map 152 may be dependent on the characteristics of the batteries 18*a*-18*d* (e.g., maximum battery capacity, battery installation location, battery voltage) or environmental characteristics (e.g., the buffer map 152 may choose a higher offset value if a detected ambient temperature is high). In an exemplary embodiment, the same buffer map 152 is utilized for each of the batteries in the storage system 16.

The power offset values for each battery output by the map 152 are passed to logic steps 154*a*-154*d*. Logic steps 154*a*-154*d* are included to ensure that each of the batteries 18*a*-18*d* is active. If a particular battery 18*a*-18*d* is active, the associated logic step 154*a*-154*d* will output the power offset value from the map 152. If the battery 18*a*-18*d* is not active, logic step 154*a*-154*d* will output a zero. The temperature compensated power offset will then be determined at step 156 by summing the power offset values from each of the active batteries. Returning to FIG. 8, this temperature compensated power offset value is subtracted from the system power limit at logic step 146.

Turning now to FIG. 10, an individual battery temperature compensated offset value is determined by control method 160. As shown, the method commences as the power limit 82*a*-82*d* and the temperature 83*a*-83*d* for each of the four batteries 18*a*-18*d* are supplied as inputs to the temperature and power buffer map 152. However, rather than summing the power offset values output from the buffer map 152 (as complete in logic step 156 of control method 150, described above), each power offset value is subtracted from each individual battery's power limit 82*a*-82*d* at logic step 164*a*-164*d*. The individually compensated power limit is then passed as an input to a closed loop power control 168*a*-168*d* for each battery.

The closed loop power control 168*a*-168*d* is performed for each battery when either the battery charge level 81*a*-81*d* or the battery current 84*a*-84*d* experiences any change in value. The control method checks for a change in value of the charge level 81*a*-81*d* and/or the current 84*a*-84*d* at logic step 166*a*-166*d*, and if a change has occurred, the logic step 166*a*-166*d* triggers performance of the closed loop power control 168*a*-168*d*, with the charge level 81*a*-81*d*, the current 84*a*-84*d*, and the individually compensated power limit output of logic step 164*a*-164*d* provided as inputs to the closed loop control.

Figure 11:
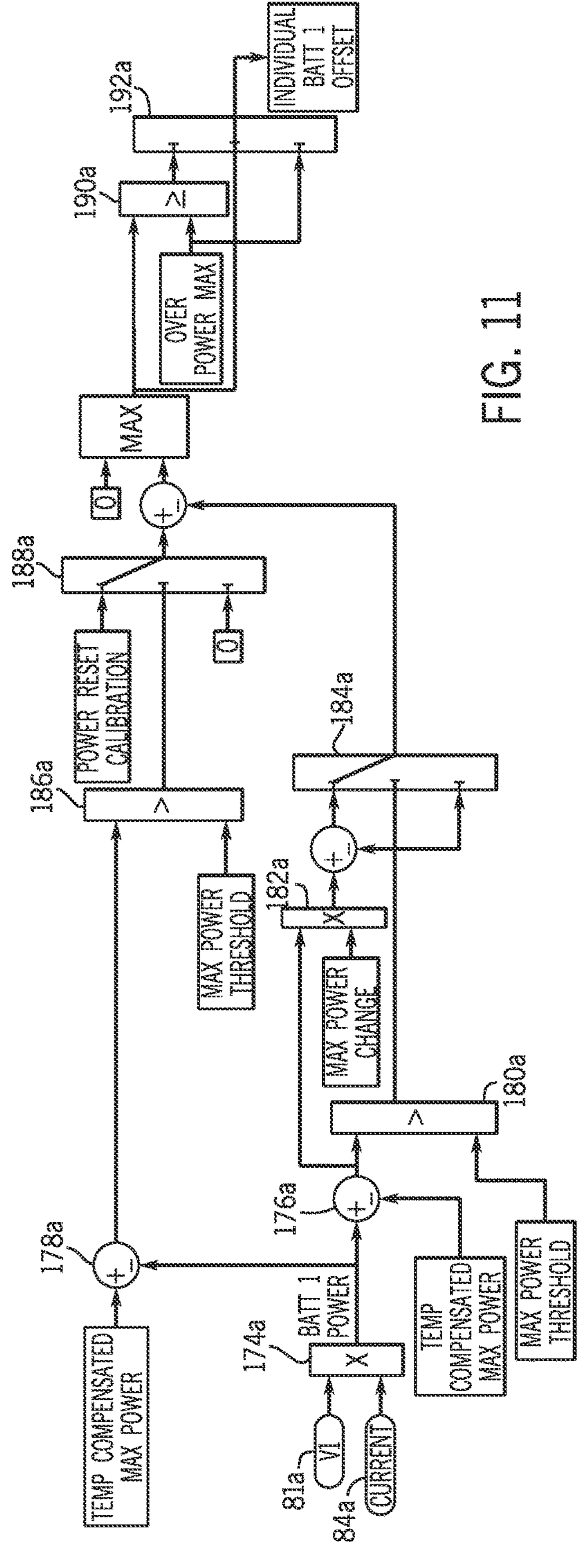
FIG. 11 is a control diagram illustrating exemplary steps for applying a closed loop power control to a plurality of batteries in accordance with the present disclosure.

Turning now to FIG. 11, the steps of the closed loop power control 168*a* for battery 18*a* are depicted. Although only closed loop power control 168*a* is depicted in FIG. 11, the same control steps would be performed for the closed loop power control 168*b*-168*d* of batteries 18*b*-18*d*. The closed loop power control commences at logic step 174*a*, in which the charge level 81*a* and the current 84*a* are multiplied to determine the present power level of the battery 18*a*. This present power level is then compared against the individually compensated power limit that was determined as the output of logic step 164*a* (see FIG. 10). If the present power level exceeds the individually compensated power limit by a certain threshold, as determined at logic steps 176*a* and 180*a*, the closed loop power control 168*a* gradually ramps out the excess power above the threshold by multiplying the excess power by a maximum power change value at logic step 182*a* and subtracting it from the present power level at logic step 184*a*. However, if the present power level is below the individually compensated power limit by a certain threshold, as determined at logic steps 178*a* and 186*a*, the closed loop power control 168*a* adds a fixed amount of allowed power as a power reset calibration value back at logic step 188*a*. Finally, at logic steps 190*a* and 192*a*, the outputs of logic step 184*a* and logic step 188*a* are compared against an overpower maximum boundary value to output an individual battery offset power value as well as saturating a minimum of zero to prevent integral windup.

Returning to FIG. 10, logic steps 170*a*-170*d* are included to ensure that each of the batteries 18*a*-18*d* is active. If a particular battery 18*a*-18*d* is active, the associated logic step 170*a*-170*d* will output the individual battery power offset from the closed loop power control logic step 168*a*-168*d*. If the battery 18*a*-18*d* is not active, logic step 170*a*-170*d* will output a zero. The individually compensated power offset value will then be determined at step 172 by summing the individual battery power offset values from each of the active batteries. Returning to FIG. 8, the individually compensated power offset value is subtracted from the temperature compensated system power limit that is output at logic step 146, resulting in a system compensated power limit output at logic step 162.

In various embodiments, the method of calculating and subtracting offset values from the system power limit may vary from the control method 140 depicted in FIG. 8. For example, control method 140 could include first subtracting the individually compensated power offset calculated by control method 160 (see FIG. 10) from the system power limit, and subsequently subtracting the temperature compensated power offset calculated by control method 150 (see FIG. 9) to calculate the system compensated power limit. In still further embodiments, calculation and subtraction of one the power offsets may be omitted from the control method 140. For example, in one embodiment, control method 160 may be omitted, and only the temperature compensated power offset calculated by control method 150 is subtracted from the system power limit to calculate the system compensated power limit. In another embodiment, control method 150 may be omitted, and only the individually compensated power offset is subtracted from the system power limit to calculate the system compensated power limit.

Figure 12:
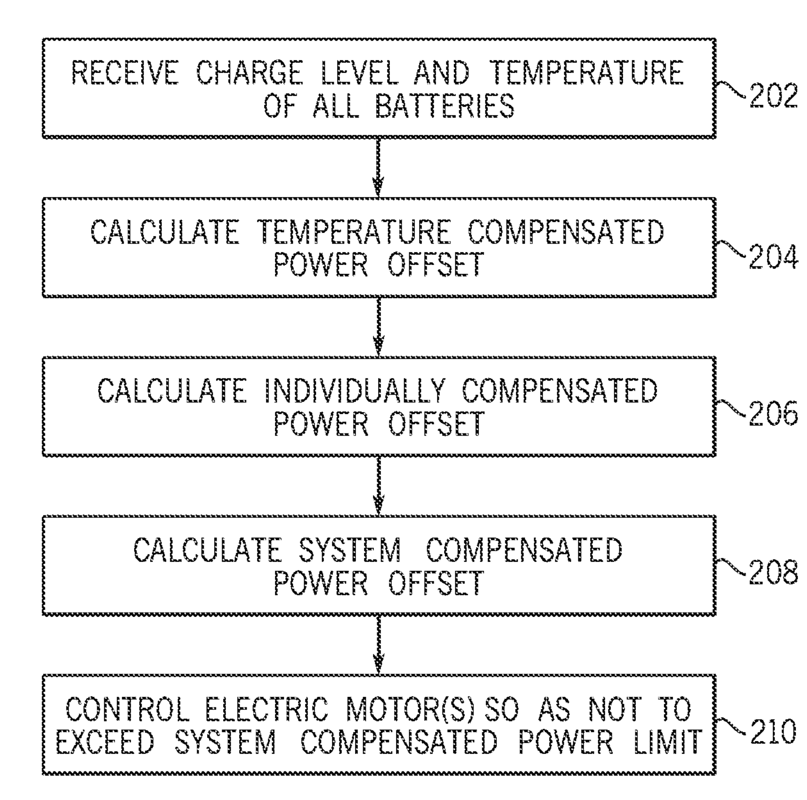
FIG. 12 is a flow chart depicting another exemplary method for controlling an electric marine propulsion system in accordance with the present disclosure.

FIG. 12 is a flow chart depicting an exemplary method 200 for controlling an electric marine propulsion system so as not to exceed a system compensated power limit determined as described herein. Charge levels and temperatures of all batteries in the power storage system 16 are received at step 202. A temperature compensated power offset based at least in part on the charge level and temperature of each of the plurality of batteries is calculated at step 204 (i.e., control method 150, see FIGS. 8 and 9). For example, the charge level and temperature may be utilized as inputs to a temperature power buffer map that outputs a power offset as is described above. The individually compensated power offset is then calculated at step 206 (i.e., control method 160, see FIGS. 8 and 10). The system compensated power limit is then calculated at step 208 based on the calculated temperature compensated power offset and individually compensated power offset. As described above, in other embodiments, certain steps of method 200 may be omitted or performed in a different order. For example, only the temperature compensated power offset calculated at step 204 may be utilized to calculate the system compensated power offset at step 208 and step 206 may be omitted from the method 200. As another example, only the individually compensated offset calculated at step 206 may be utilized to calculate the system compensated power offset at step 208 and step 204 may be omitted from the method 200.

The one or more electric motors in the electric marine drives 3 are then controlled at step 210 so as not to exceed the system compensated power limit. For example, the motor controller 14 may be configured to limit a power draw, such as by limiting a current draw, from the electric motor 4 so as not to exceed the system compensated power limit. Alternatively, the control system may be configured to impose a demand limit based on the system compensated power limit, where user demand values greater than the demand limit are not effectuated, thereby preventing the system compensated power limit from being exceeded and preventing overdrawing power from any one of the plurality of batteries in the power storage system 16.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. An electric marine propulsion system configured to propel a marine vessel, the system comprising:

- a power storage system comprising at least one battery;
- at least one electric motor powered by the power storage system and configured to rotate a propulsor to propel the marine vessel;
- a control system configured to:
  - identify a temperature for each of the at least one battery;
  - identify a maximum power limit for each of the at least one battery;
  - determine a system temperature offset for the power storage system based at least in part on the temperature and the maximum power limit for each of the at least one battery, wherein determining the system temperature offset comprises outputting a power offset value for each of the at least one battery from a temperature and power buffer map;
  - apply the system temperature offset to a system power limit for the power storage system to calculate a temperature compensated system power limit for the power storage system; and
  - control the at least one electric motor based at least in part on the temperature compensated system power limit.

2. The system of claim 1, wherein determining the system temperature offset further comprises:

- determining whether each of the at least one battery comprises an active battery; and
- responsive to a determination that the at least one battery comprises an active battery, adding the power offset value associated with the active battery to the system temperature offset.

3. The system of claim 1, wherein the control system is further configured to subtract the power offset value from the maximum power limit to calculate an individually compensated power limit for each of the at least one battery.

4. The system of claim 3, wherein the individually compensated power limit is provided as an input to a closed loop power control for each of the at least one battery.

5. The system of claim 4, wherein the closed loop power control is performed for each of the at least one battery responsive to a change in at least one of a charge level and a current level of the at least one battery.

6. The system of claim 4, wherein the closed loop power control is configured to output an individual battery power offset value for each of the at least one battery.

7. The system of claim 6, wherein the control system is further configured to:

determine whether each of the at least one battery comprises an active battery; and responsive to a determination that the at least one battery comprises an active battery, add the individual battery power offset value to an individually compensated power offset.

8. The system of claim 7, wherein the control system is further configured to apply the individually compensated power offset to the system power limit.

9. The system of claim 1, wherein the at least one battery includes at least two batteries connected in parallel to power the at least one electric motor.

10. A method of controlling an electric marine propulsion system having a power storage system comprising at least one battery and at least one electric motor powered by the at least one battery and configured to rotate a propulsor to propel a marine vessel, the method comprising:

identifying a temperature for each of the at least one battery;

identifying a maximum power limit for each of the at least one battery;

determining a system temperature offset for the power storage system based at least in part on the temperature and the maximum power limit for each of the at least one battery, wherein determining the system temperature offset comprises outputting a power offset value for each of the at least one battery from a temperature and power buffer map;

applying the system temperature offset to a system power limit for the power storage system to calculate a temperature compensated system power limit for the power storage system; and controlling the at least one electric motor based at least in part on the temperature compensated system power limit.

11. The method of claim 10, wherein determining the system temperature offset further comprises:

determining whether each of the at least one battery comprises an active battery; and responsive to a determination that the at least one battery comprises an active battery, adding the power offset value associated with the active battery to the system temperature offset.

12. The method of claim 10, wherein the method further comprises subtracting the power offset value from the maximum power limit to calculate an individually compensated power limit for each of the at least one battery.

13. The method of claim 12, wherein the individually compensated power limit is provided as an input to a closed loop power control for each of the at least one battery.

14. The method of claim 13, wherein the method further comprises performing the closed loop power control for each of the at least one battery responsive to a change in at least one of a charge level and a current level of the at least one battery.

15. The method of claim 13, wherein the closed loop power control is configured to output an individual battery power offset value for each of the at least one battery.

16. The method of claim 15, wherein the method further comprises:

determining whether each of the at least one battery comprises an active battery; and responsive to a determination that the at least one battery comprises an active battery, adding the individual battery power offset value to an individually compensated power offset.

17. The method of claim 16, wherein the method further comprises applying the individually compensated power offset to the system power limit.

18. The method of claim 10, wherein the at least one battery includes at least two batteries connected in parallel to power the at least one electric motor.

* * * * *